March 6, 1951  R. W. PHELPS ET AL  2,544,352
GOVERNOR WITH ADJUSTING MECHANISM
Filed Feb. 8, 1945  2 Sheets-Sheet 1

INVENTORS
R.W. PHELPS
L.T. RUTLEDGE
BY
ATTYS

March 6, 1951 R. W. PHELPS ET AL 2,544,352
GOVERNOR WITH ADJUSTING MECHANISM
Filed Feb. 8, 1945 2 Sheets-Sheet 2

INVENTORS
R.W. PHELPS
L. T. RUTLEDGE
BY
ATTYS

Patented Mar. 6, 1951

2,544,352

UNITED STATES PATENT OFFICE 2,544,352

GOVERNOR WITH ADJUSTING MECHANISM

Ross W. Phelps, Orillia, Ontario, and Lewis T. Rutledge, Kingston, Ontario, Canada; said Rutledge assignor to said Phelps Application February 8, 1945, Serial No. 576,890

1 Claim. (Cl. 264—3)

This invention relates to an improvement in governors employed for the purpose of regulating the speed of machinery, one particular application of which is the regulation of the speed of internal combustion engines used as stationary prime movers or of engines in automotive machinery, including engines in farm tractors and other similar machinery.

A main object of this invention is to provide a governor of the centrifugal type which is particularly efficient in its operation and approaches more closely than heretofore the characteristics of the ideal governor.

The ideal governor is one that is isochronous without any hunting action, and which is extremely sensitive, at the same time having the correct stability. By "isochronism" is meant that the speed of the governor will not vary during the entire range of travel of its actuating sleeve, or in other words, the valve controlling the full admission may be moved into any position to suit the engine load, and yet the engine and also the governor will always run at the same speed. By "sensitiveness" is meant the proportional change of speed which occurs while the sleeve goes through its complete travel, the governor most sensitive being that which has the least variation. Mathematically the sensitiveness is the ratio found by dividing an infinitesimal increment of the angular velocity by the average angular velocity. The smaller this ratio, the more sensitive is the governor. For the isochronous governor the infinitesimal variation of the angular velocity is zero, or $\delta\omega$ is zero where $\omega$ is the angular velocity in radius per second using the nomenclature of the differential calculus.

Many years ago it was discovered that a perfect isochronous governor can be obtained if the governor balls move on a curved track of parabolic form so that they will always remain on the surface of a paraboloid of revolution of which the spindle of the governor is the axis. This governor when so constructed had the serious defect that it was in its action unstable and had no definite position for a given speed and thus the slightest disturbing force caused the governor balls to move to one end or the other of their extreme range so that the governor hunted for a position of stable equilibrium.

Another object of the invention is to provide a governor that is almost perfectly isochronous without any tendency to hunt.

A further object of the invention is to provide a governor making use of a spring and control so that different constant speeds within a wide range may be obtained without loss of the characteristics of isochronism, sensitiveness and stability.

A further object of the invention is the use of a single helical tension spring having simultaneously two separate actions, one an oscillatory motion of the whole spring body about its lower end as a fulcrum, the spring swinging through an arc following the motion of the governor lever to which the upper end of the spring is attached. The second movement is an extension or contraction under varying stress and strain to balance the centrifugal forces of the revolving governor weights under varying conditions of loading. It should be noted under this invention that the least extension of the spring accompanies the conditions of maximum load on the engine.

A further object of the invention is to provide means of adjusting the preloading of the spring and the length of the link connecting the governor lever to the butterfly valve to suit any desired engine speed. This adjustment may be made either at the governor or by remote control through a suitable mechanical linkage which is common to automotive machinery.

Another object of the invention is to provide a governor with few moving parts and a means of imparting a motion of translation along the governor shaft to a compound sleeve so designed that it constitutes a thrust ball bearing. The transfer of motion is so arranged that the part of the compound sleeve in control with the governor weights has a motion of rotation as its principal motion but also translation when the sleeve moves axially. The third element in the compound sleeve has only the motion of translation common to the first element as its principal motion. The two sleeve elements are connected by a ball bearing adapter, all of which provides a unit of minimum friction. Thus a further object of the invention is to provide a sliding sleeve with no eccentricity of motion. The assembly is perfectly balanced transversely and accordingly there is no tendency toward a binding action between the sleeve and the shaft. Also the invention provides that the effect of gravity is zero since the governor weights revolve in a vertical plane.

A further object of our invention is to provide a governor small in linear dimensions and cubic content so that it may be easily fitted to any engine on which it may be used.

An additional object of the design is to provide means of reducing the friction to a minimum by the use of anti-friction bearings and also by the use of splash lubrication over all moving parts within the governor housing.

A still further object of the design and one new to governors is to provide a governor action that functions, at the starting of the engine, as an automatic choke so that the throttle valve will be open full at the start but as the engine gains speed the valve will be gradually closed to the closure for the idling speed.

With these and other objects in view the invention generally embodies a governor mechanism including governor weights actuating mechanism controlled thereby including a lever and a resisting spring restraining the normal movement of the lever, the said spring being so related to the lever as to act sensitively and permit operation of the governor in a substantially isochronous manner and without hunting action.

The invention will be clearly understood by reference to the following detailed specification taken in conjunction with the accompanying drawings.

Referring to the drawings.

Figure 1:
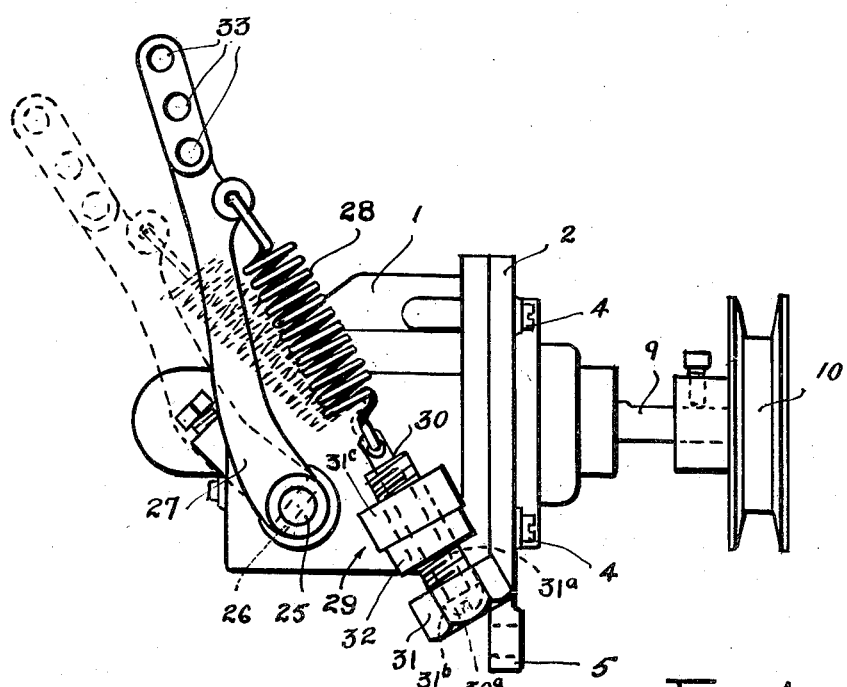
Fig. 1 is a side elevation of a governor according to the present invention.
Figure 2:
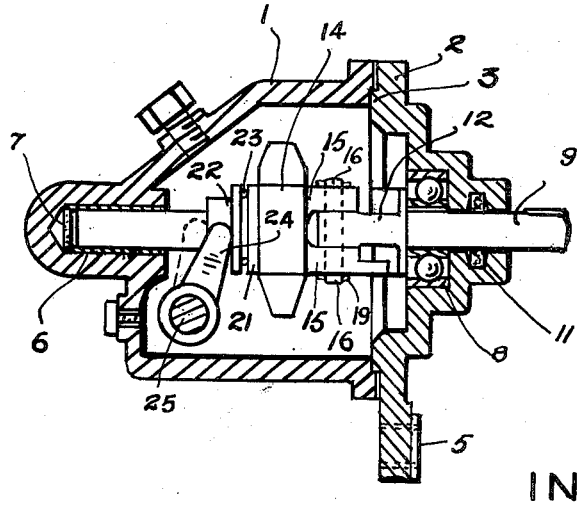
Fig. 2 is a longitudinal section taken through the casing of the governor to illustrate the combination and arrangement of certain of the parts thereof.
Figure 3:
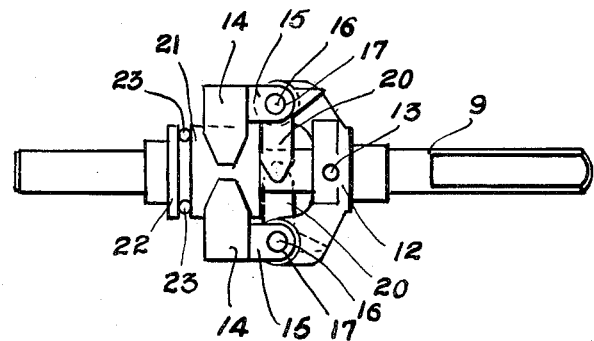
Fig. 3 is a side elevation of the governor shaft, the governor weights and assembly actuated thereby.
Figure 4:
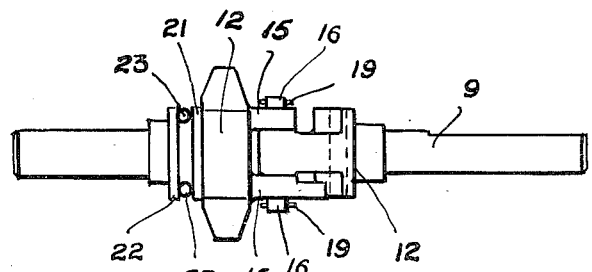
Fig. 4 is a top plan view of Fig. 3.
Figure 5:
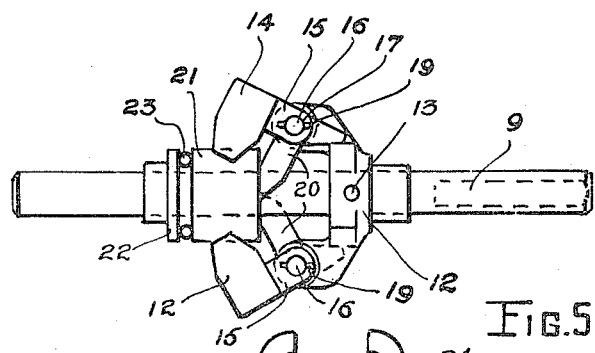
Fig. 5 is a side elevation similar to Fig. 3 but showing the governor weights moved outwardly and shifting the actuating assembly on the shaft.
Figure 6:
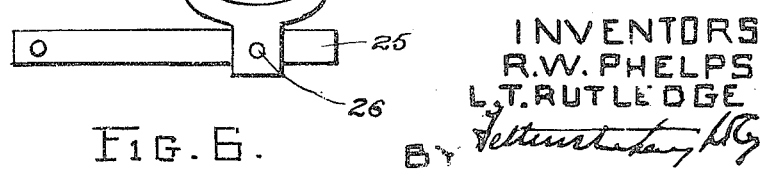
Fig. 6 is a detailed side elevation of a fork construction operating between the actuating assembly on the governor shaft and the lever actuated by the governor.

Referring to the several drawings, it will be apparent in our invention that we use a governor casing 1 and an end cap 2, the two being held together in good alignment on a spigoted joint 3 with cap screws 4. The end cap 2 has cast integral with it a projection 5 with tapped holes for fastening to the body of the engine. The spacing of the cap screws admit of the cap being turned at right angles for convenience in fastening to the engine. The governor casing 1 and the end cap 2 constitute the frame of the governor. The closed end of the casing is fitted with a bronze bearing sleeve 6 and thrust disc 7 while the end cap is fitted with a radial thrust ball bearing 8. Mounted on the central longitudinal axis of the casing and end housing is a polished governor shaft 9 which extends beyond the end housing to carry a driving pulley 10, or a gear, if such be used instead of a V-pulley. Leakage of lubricant around the shaft is prevented by suitable packing 11.

A governor weight support 12 is pinned securely to the shaft 9 by the pin 13 and the two similar governor weights 14 are carried by arms 15 which are fastened to the support 12 by two pins 16. The said pins 16 are a tight fit in part 12 but an easy fit in the two reamed and smoothly finished holes 17 in each arm 15 to produce a fit giving free motion with a minimum of friction.

The locking wire loops or split cotter pins 19 may be employed to retain the arms 15 on the pins 16 to retain the governor weights in central position relative to the governor weight support. Each of the arms 15 are provided with projecting fingers 20, the ends of which are chamfered or otherwise tapered to provide actuating fingers designed to engage a sliding actuating assembly carried on shaft 9 and preferably made up of several elements. The fingers 20 are designed to engage the end of the slidable sleeve 21 forming part of the assembly and slidably mounted on the shaft 9. The construction presupposes no relative motion between the governor weights and the sleeve 21. However, as the governor weights move out or in, radially, as the shaft 9 rotates, the sleeve 21 has a rotational movement and moves axially along the shaft.

As the weights 14 move outwardly upon rotation of the shaft 9 the fingers 20 cause sleeve 21 to move along the shaft which motion is transferred to the thrust plate 22 through the medium of the ball bearings 23. The facing surface of the thrust plate and the adjacent end of the sleeve 21 are provided with suitable grooves to accommodate the ball bearings 23, the sleeve 21, thrust plate 22 and ball bearings 23, being hardened and ground so that the assembly partakes of the nature of a regular thrust ball bearing which has an easy sliding engagement with the polished shaft 9 so that friction under the conditions for instance of splash lubrication, is negligible. The motion of sleeve 21 during operation is continuously a motion of rotation with intermittent motions of translation, while the motion of thrust plate 22 is primarily an intermittent motion of translation. This motion of translation is transmitted to a fork member 24 which in effect straddles the shaft 9 and is disposed to be engaged by the thrust plate 22. The fork 24 is rigidly pinned to the cross shaft 25 such as by the pins 26. The cross shaft 25 is freely journalled in the casing to turn when torque is applied to it such as by the thrust plate 22. At its outer end, exteriorly of the casing 1, it rigidly carries the lever 27 which is connected thereto so that the proper angular relationship of lever 27 relative to the fork 24 and the shaft 25 is provided.

The resistance to the centrifugal force of the revolving governor weights 14, as transferred through the fork 24 to the shaft 25, is provided by a helical tension spring 28 fastened at its upper end to the lever 27 and at its lower end to an adjustable anchorage 29, such as the spring holder pin 30 assembled with the adjusting screw 31. The screw 31 is formed with a continuous bore 31a and its head is provided with an enlarged recess 31b to receive the head 30a of the spring holding pin 30. The adjusting screw 31 is in screw threaded engagement with the threaded bore of the bracket 31c so that axial adjustment of the spring is effected by turning the adjusting screw and the connection of the spring with pin 30 will assure that this pin will not turn with the rotation of the screw 31 by any slight frictional contact. The design is such therefore that the adjusting screw may be turned without turning the spring circumferentially. A lock nut 32 is preferably provided to lock the adjusting screw in any desired position. The movement of the lever 27 is transferred to a butterfly valve (not shown) connected by suitable linkage adjustably, in any of the plurality of the orifices 33 provided in the end of lever 27. The connecting linkage is made adjustable in length so that the opening of the valve may be correct with the position of the lever and may be set for idling conditions.

Though the speed of the engine may be changed by changing the preloading of the spring 28, by regulating the setting of the adjusting screw 31, the governor is primarily a device to regulate the supply of fuel to the engine, in which the governor and therefore the engine runs at any predetermined constant speed. The tension the spring 28 is adjusted to give any desired engine speed with the butterfly valve slightly open. In other words, the engine will idle at this speed while the valve control lever 27 is well advanced to the left and the spring 28 then is under higher tension as it has an additional deflection to that given it by preloading and, the governor weights 14, in this case, close to their outer radial limit. As load is assumed by the engine the weights 14 revolve with a lesser radius of rotation and the lever 27 swings clockwise in an arc. Concurrently with this movement the spring 17 revolves bodily in the same arcuate path but one of lesser radius. The butterfly valve is opened to admit a greater quantity of fuel to the engine and the movement of the spring clockwise shortens the spring and reduces the tension in it.

A salient feature in this governor is the angularity of the axis of the spring 28 relative to the longitudinal axis of the lever 27. The angle is an acute angle of small value and has been carefully and mathematically determined. The common practice in governors is to connect springs at right angles to the links whose motion they are restraining. Such a setup results in a wide variation of spring opposition from no load to full load. For example, suppose to stretch the spring $1/8$ inch a pull of 10 pounds is required, then to stretch it $3/4$ inch a pull of 60 pounds approximately is necessary. This is the condition that does most to destroy the desirable property of isochronism; whereas in our invention the elongation of the spring through the full arc of rotation will be only about $1/8$ inch in excess of the elongation that is constant and due to preloading. It is quite apparent that where there is such a small variation in spring tension between the conditions of no load and full load that the governor has high sensitiveness.

This unusual spring assembly provides a means, with its possible adjustment and regulation, of making the governor as nearly isochronous as is desired for a practical governor. The angular velocity of the governor shaft 9 for all positions of the governor weights 14 will be almost constant. Then the centrifugal force will depend only on the radius of rotation. To illustrate, let three positions of the governor weights be assumed so that the radii of rotation are $r_1$, $r$, and $r_2$ feet with $r_1$ the radius of the extreme out-position and $r_2$ that of the extreme in-position. Then consider $r$ the radius of any intermediate position. Let $C_1$, $C$ and $C_2$ be the corresponding centrifugal forces.

Then $$C_1 = \frac{W}{g} r_1 \omega_1^2 \text{ pounds}$$

$$C = \frac{W}{g} r \omega^2 \text{ pounds}$$

$$C_2 = \frac{W}{g} r_2 \omega_2^2 \text{ pounds}$$

in which W is the weight in pounds of the revolving mass causing centrifugal force. The symbol "$g$" stands for the acceleration due to gravity and is 32.2 feet per second. $\omega_1$, $\omega$, and $\omega_2$ are the respective angular velocities in radians per second. In our invention the revolving mass W is very light in weight since the governor weights 14 in the governor shown by the drawings weigh 6 ounces.

For this governor, when the angularity of the spring assembly is correctly calculated and established and when the spring is correct which is possible to attain by mathematical calculation and by practical experiment, then for the governor as invented $$\frac{C_1}{R_1} = \frac{C}{R} = \frac{C_2}{R_2} = \text{a constant}$$

for all practical purposes. This is the requirement for a condition close to perfect isochronism.

The condition may be graphically represented by plotting the centrifugal forces as ordinates against the radii as abscissae. The characteristic curve for this governor is nearly a straight line and as close to a straight line as is desired. The departure of our governor characteristics from the straight line is just sufficient to eliminate hunting action. This condition is principally obtained, as suggested already, by having the angularity of the spring axis with respect to the axis of the lever a definitely predetermined and calculated value.

In the action of the governor, the weights 14 in moving outward force the sleeve 21 and plate 22 to the left and thus the governor lever arm 27 is rotated anti-clockwise to close the butterfly valve, at the same time increasing the tension in the opposing spring 28. But there is a counteracting action taking place that may be considered as reciprocal to the above described action. The spring tends to pull the lever back and the sleeve will be moved back to the right if there is any increase in the load on the engine. An infinitesimal change of engine speed is immediately taken care of by the spring action opening the valve the necessary amount to take care of the increased load. The action is automatic and instantaneous. Due to the small changes in spring tension, even over the whole range, the changes in governor speed are infinitesimal and immediately taken care of so that the differential quantity $$\frac{S\omega}{\omega}$$

approaches zero for this governor. In governors with the spring attached at right angles to the governor lever and with large changes in the governor tension, the speed of the governor and therefore the engine has definitely to change an appreciable amount before the governor can open or close the butterfly valve. There is a definite time lag which under a sudden and large increase of load will allow the engine to stall, even though the engine is of sufficient power to carry the load. With our governor, this will not happen and has been proved to be true by the most severe tests.

The invention provides that the governor weights and revolving parts are always in balance in all positions and also that the governor flyweights revolve in a vertical plane so that the effect of gravity is zero.

The governor has the necessary power which is a feature desirable in governors. This is made possible by the use of an exceptionally strong tension spring, a spring much stiffer than it would be if connected at right angles to the lever whose motion it is restraining. Accordingly, our invention provides a governor which is extremely sensitive, but at the same time has the desired power so that it will not easily be disturbed by outside forces.

It should be noted also that as compared with other governors employing a spring or springs in different relation to the throttle lever, the governor of the present invention substantially eliminates or materially reduces fatigue in the spring which in other designs where the spring is extended to carrying degrees result in substantial fatigue. Therefore the governor of the present invention provides for a much longer life of spring.

Finally it should be apparent that our invention provides a further important feature which is peculiar to the governor and new in the field of internal combustion engine governors. It is that the governor at starting performs the function of an automatic choke in the feeding of fuel to the engine. Due to the heavy preloading of the governor spring, the throttle valve is full open when the engine is stopped. At the starting of the engine a full charge of fuel is admitted to the cylinders. As the engine gains speed, then the action of the governor weights moves the lever to the left, as in Fig. 1, lengthening the resisting spring and closing the butterfly valve to the predetermined and regulated position for engine idling.

It will be seen from the foregoing that the governor in effect varies from known governors only to a small degree as it includes substantially all the relative parts to perform the governing action necessary, but by changing the principle of control mainly the marked advance above outlined is attained. It will be apparent, therefore, that these markedly improved results may be attained without complicating the governor construction and, therefore, the construction can be produced practicably and economically while providing such improved results. It is apparent, of course, that some changes may be made in the construction and cooperation of parts while maintaining the principle of the assembly.

What we claim as our invention is:

A governor comprising in combination, a casing, a governor shaft connectable to an engine, a swingable operating lever pivotally mounted on said casing and means for swingably moving said lever on its pivotal mounting responsive to the speed of rotation of said shaft, a helical tension spring having its one end connected to said lever adjacent the free end of the latter, and an anchorage assembly extending from said casing adjacent the pivotal mounting of said lever to mount the other end of said spring and comprising a bracket extending from said casing, an adjusting screw threaded in said bracket and having an axial bore, a spring holding pin slidably mounted in said bore and including means for connecting the same to the other end of said spring, means at the other end of said holding pin for retaining the same against axial movement within said screw in the direction of said spring, and a locking nut on said screw for retaining the latter fixed in a position of adjustment.

ROSS W. PHELPS.
LEWIS T. RUTLEDGE.

REFERENCES CITED

The following references are of record in the file of this patent:

UNITED STATES PATENTS

| Number | Name | Date |
|---|---|---|
| 1,910,899 | Hoof | May 23, 1933 |
| 1,954,864 | Crafts | Apr. 17, 1934 |
| 1,959,515 | Altenberg | May 22, 1934 |
| 2,107,990 | Leibing | Feb. 8, 1938 |
| 2,170,744 | Adler | Aug. 22, 1939 |
| 2,250,982 | Adler | July 29, 1941 |
| 2,250,983 | Adler | July 29, 1941 |
| 2,250,984 | Adler | July 29, 1941 |
| 2,356,202 | Benjamin | Aug. 22, 1944 |